(12) United States Patent
Minkara

(10) Patent No.: US 7,780,934 B2
(45) Date of Patent: Aug. 24, 2010

(54) METHOD AND SYSTEM FOR REDUCING AMMONIA SLIP AFTER SELECTIVE REDUCTION OF NOX

(75) Inventor: Rafic Y. Minkara, Kennesaw, GA (US)

(73) Assignee: Headwaters Incorporated, South Jordan, UT (US)

( * ) Notice: Subject to any disclaimer, the term of this patent is extended or adjusted under 35 U.S.C. 154(b) by 407 days.

(21) Appl. No.: 11/662,035

(22) PCT Filed: Sep. 6, 2005

(86) PCT No.: PCT/US2005/032149

§ 371 (c)(1),
(2), (4) Date: Mar. 23, 2007

(87) PCT Pub. No.: WO2006/029311

PCT Pub. Date: Mar. 16, 2006

(65) Prior Publication Data

US 2008/0089821 A1    Apr. 17, 2008

Related U.S. Application Data

(60) Provisional application No. 60/607,797, filed on Sep. 8, 2004.

(51) Int. Cl.
*B01D 53/56* (2006.01)
*B01D 53/58* (2006.01)

(52) U.S. Cl. .................. 423/235; 423/237; 423/238; 423/239.1; 423/215.5

(58) Field of Classification Search ............... 423/235, 423/237, 238, 239.1, 215.5; 422/168–172, 422/177; 60/721

See application file for complete search history.

(56) References Cited

U.S. PATENT DOCUMENTS 4,273,747 A    6/1981   Rasmussen (Continued)

FOREIGN PATENT DOCUMENTS

DE    196 52 902 A1    6/1998

(Continued)

OTHER PUBLICATIONS

Galbreath, Kevin C., "Mercury Transformation in Coal Combustion Flue Gas," Fuel Processing Technology, 65-66 (2000) pp. 289-310.

(Continued)

*Primary Examiner*—Timothy C Vanoy
(74) *Attorney, Agent, or Firm*—Wegman, Hessler & Vanderburg

(57) ABSTRACT

A process is described that removes by chemical oxidation the excess ammonia ($NH_3$) gas from flue gases that have been subjected to selective catalytic reduction (SCR) and selective non-catalytic reduction (SNCR) of oxides of nitrogen ($NO_x$) by ammonia injection. Methods for the removal of residual ammonia from flue gases prior to fouling air pre-heaters or deposition on fly ash are discussed.

8 Claims, 2 Drawing Sheets

U.S. PATENT DOCUMENTS

| | | | |
|---|---|---|---|
| 5,069,886 A * | 12/1991 | Frey et al. | 423/237 |
| 6,197,268 B1 * | 3/2001 | Hwang et al. | 423/235 |
| 6,284,208 B1 | 9/2001 | Thomassen | |
| 6,808,692 B2 | 10/2004 | Oehr | |
| 2003/0020927 A1 | 1/2003 | Mukherji | |
| 2003/0202927 A1 * | 10/2003 | Minkara et al. | 423/237 |
| 2009/0087367 A1 * | 4/2009 | Liu et al. | 423/237 |

FOREIGN PATENT DOCUMENTS

| | | |
|---|---|---|
| EP | 1 064 981 A1 | 1/2001 |
| JP | 55015667 | 2/1980 |
| JP | 63100918 | 5/1988 |
| WO | WO 01/66486 A1 | 9/2001 |
| WO | WO 02/092195 A1 | 11/2002 |

OTHER PUBLICATIONS

Lee, Chun Wai et al., "Mercury Control Research: Effects of Fly Ash and Flue Gas Parameters on Mercury Speciation", Annual Waste Energy Conf., Proceedings of a Specialty Conference, 6th Miami Beach, Fl, May 11-13, 1998.

* cited by examiner

METHOD AND SYSTEM FOR REDUCING AMMONIA SLIP AFTER SELECTIVE REDUCTION OF NOX

CROSS-REFERENCE TO RELATED APPLICATION

The present application claims priority under 35 U.S.C. §119(e) to U.S. Provisional Patent Application No. 60/607,797, filed Sep. 8, 2004 and entitled "METHOD TO ENHANCE SCR AND SNCR SYSTEMS".

BACKGROUND OF THE INVENTION

1. Field of Invention

This invention relates to systems and methods for the removal of residual ammonia from flue gas of a power plant that have been subjected to selective catalytic reduction (SCR) and selective non-catalytic reduction (SNCR) of oxides of nitrogen ($NO_x$), and more specifically, to a process that removes excess ammonia from flue gas by chemical oxidation.

2. Description of Related Art

In recent years, there has been increasing public and government concern over the environmental impacts of the emissions of power plants. For example, the exhaust gas of coal-fired power plants contains pollutants such as nitrogen oxides ("NOx") and sulfur oxides ("SOx"), as well as particulates termed "fly ash". Environmental laws establish permissible levels of gaseous pollutants and particulates that may be emitted from the exhaust stack of the plant. In order to reduce the levels of $NO_x$ emissions from power plants, as required by environmental regulations, many electric generating units are forced to remove $NO_x$ from the flue gas. Various types of pollution control equipment are available to reduce the levels of gaseous pollutants and particulates from the flue gas before it reaches the exhaust stack.

In one typical way of removing $NO_x$ from the flue gas, a nitrogenous compound, such as ammonia or a urea based reagent, is injected into the flue gas stream. The ammonia reacts with the $NO_x$ to form nitrogen gas and water, thus reducing the $NO_x$ content of the flue gas. The reaction of ammonia and $NO_x$ may be performed at high temperature without a catalyst, a process termed "selective non-catalytic reduction" (SNCR), or at lower temperature in the presence of a catalyst, a process termed "selective catalytic reduction" (SCR). SNCR is accomplished by injecting ammonia or urea based reagents into the upper furnace to reduce the oxides of nitrogen without the use of a catalyst and permitting the reduction reaction to occur in the flue gas. SNCR reactors typically operates at flue gas temperatures ranging between 850° C. and 1150° C. SCR is generally accomplished at lower temperatures than SNCR, and necessitates the use of a catalyst, such as vanadium oxide, which is placed onto surfaces of catalyst modules positioned within the flue gas stream where the ammonia reacts to reduce the oxides of nitrogen. SCR reactors typically operates at flue gas temperatures ranging between 300° C. and 450° C. At coal-fired power plants, ammonia injection systems for SCR and SNCR reactors are typically installed in the high-temperature and high-dust region of the flue gas stream that is typically located prior to combustion air pre-heaters and ash collection.

It is important to accomplish the reaction of the ammonia and $NO_x$ in an efficient manner for maximum possible reaction of the $NO_x$. For selective catalytic reduction (SCR) of oxides of nitrogen with ammonia to work well and result in the lowest values of $NO_x$, it is preferable to be able to use excess ammonia. However, when the quantity of ammonia used is high enough to effectively remove the $NO_x$ through SCR, some of the excess ammonia will go through the catalyst unchanged and exit as "ammonia slip" in the flue gas. Ammonia slip may cause downstream equipment problems such as clogging of the space between adjacent air preheater heating elements because of the formation of ammonium sulfate/bisulfate, and/or agglomerated fly ash. The ammonia slip problem is further exacerbated as the result of SCR catalyst surface deterioration as well as misdistribution in flue gas velocity, temperature, and concentrations of ammonia and $NO_x$.

Another major problem created by ammonia slip in coal fired plants is the ammonia contaminates the fly ash. Many power plants dispose of the collected fly ash by selling it to purchasers who further process the fly ash for commercial uses such as for use in mixtures with cement to make concrete. The degree of ammonia contamination in the fly ash, and associated concentration levels, vary among power plants depending on the rate of ammonia injection, the performance of the SCR or SNCR process, the amount of $SO_3$ in the flue gas and the associated operating conditions of the boiler and air pollution control devices. It has been observed that fly ash produced from high sulfur eastern bituminous coal (Class F fly ash) adsorbs more ammonia than fly ash produced from low sulfur western sub-bituminous coal (Class C fly ash). The presence of sulfur in the flue gas increases the associated deposition of ammonia in the form of $(NH_4)_2SO_4$ and $NH_4HSO_4$. The high alkaline condition of Class C ash inhibits its ammonia cation ($NH_4^+$) formation.

Typical ammonia concentrations on fly ash, as a result of ammonia injection, ranges between 50-120 mg/kg for SCR generated fly ash, 250-600 mg/kg for SNCR generated fly ash, and 700-1200 mg/kg for ESP generated fly ash. When ammonia-laden fly ash is used in cementitious slurry applications, the ammonium salts dissolve in water to form ammoniam cations ($NH_4^+$). Under the high pH (e.g., pH>12) condition created by cementitious alkali, ammonium cations ($NH_4^+$) are converted to dissolved ammonia gas ($NH_3$). Ammonia gas evolves from the fresh cementitious slurry into the air, exposing workers. The rate of ammonia gas evolution depends on ammonia concentration, mixing intensity, exposed surface, and ambient temperature. Ammonia has no measurable effect on concrete quality (strength, permeability, etc.).

Ammonia gas odors could range from mildly unpleasant to a potential health hazard. Ammonia odors are detected by the human nose at 5 to 10 ppm levels. The OSHA threshold and permissible limits are set at 25 and 35 ppm for the time weighted average—eight-hour (TWA 8-hr) and the short term exposure limit—fifteen-minute (STEL 15-min), respectively. Ammonia gas concentration of 150-200 ppm can create a general discomfort. At concentrations between 400 and 700 ppm ammonia gas can cause pronounced irritation. At 500 ppm, and above, ammonia gas is immediately dangerous to health; at 2,000 ppm, death can occur within minutes. Other than OSHA exposure limits, there are no regulatory, industry or ASTM standards or guidelines for acceptable levels of ammonia in fly ash. However, based on industry experience, fly ash with ammonia concentration at less than 100 mg/kg does not appear to produce a noticeable odor in ready-mix concrete. Depending on site and weather conditions, fly ash with ammonia concentration ranging between 100-200 mg/kg could result in unpleasant or unsafe concrete placement and finishing work environment. Fly ash with ammonia concentration exceeding 200 mg/kg produces unacceptable odor when used in ready-mixed concrete applications. If the ammonia amount of which adheres to the fly ash is relatively high there can be potential health risks from ammonia gas when mixing the fly ash with the cement slurry. In addition to the risk of human exposure to ammonia gas evolving from concrete produced using ammonia laden ash, the disposal of ammonia laden ash in landfills and ponds at coal burning power stations could also create potential risks to the environment. Upon contact with water, the ammonium salts leach into the water and could be carried to ground water and nearby rivers and streams causing potential environmental damage such as ground water contamination, fish kill and eutrophication. Ammonia gas could also evolve upon wetting of alkaline fly ashes, such as those generated from the combustion of western sub-bituminous coal. Water conditioning and wet disposal of alkaline fly ashes would expose power plant workers to ammonia gas.

The invention herein deals with pollution control systems which utilize ammonia within the process in order to initiate, cause and/or supplement the removal of $NO_x$, and in particular SCR, SNCR and/or staged systems (i.e., systems which include one or more SCR or SNCR reactors). The process to be described herein uses a chemical injection system to reduce the ammonia slip by reacting the ammonia with an oxidizing agent.

SUMMARY OF THE INVENTION

In one aspect, the invention provides a process that reduces the ammonia slip by chemical oxidation to levels that will reduce downstream equipment fouling, contamination of the fly ash, and improve the overall performance of SCR and SNCR reactors installed to control $NO_x$ emissions by permitting the injection of higher levels of ammonia into the flue gasses. In another aspect of this invention the residual ammonia that is deposited in the fly ash by the exiting flue gas is reduced by the described process.

Another aspect the invention is directed to a method for reducing ammonia slip in flue gas of a fossil fuel burning power plant, the power plant having an oxides of nitrogen ($NO_x$) reducing system and a fly ash collecting device, wherein ammonia is used for reducing the levels of $NO_x$. The method includes adding ammonia from an ammonia addition station to the flue gas to reduce oxides of nitrogen ($NO_x$). The method also includes providing a chemical reagent addition system downstream from the ammonia addition station. The method also includes adding an oxidizing chemical reagent from the chemical reagent addition system to form an ammonia oxidation zone in the flue gas exhaust duct upstream of the fly ash collecting device such that the flue gasses exiting the ammonia oxidation zone have a residual ammonia concentration of less than about 20 ppm.

In another aspect, the invention is directed to a fossil fuel burning power plant producing flue gas that contain nitrogen oxides ($NO_x$). The plant includes a furnace, fly ash collecting device, a stack through which flue gasses are released from the plant, and a flue gas exhaust duct leading from the furnace to the stack for carrying the flue gasses. The plant also includes an SNCR reactor and/or an SCR reactor for reducing $NO_x$ downstream from the furnace by injecting a nitrogenous compound into the flue gas exhaust duct to convert $NO_x$ in the flue gasses into free nitrogen and water. The plant also includes a chemical reagent addition system located downstream of the SCR and/or SNCR reactors. The chemical reagent addition system adds an ammonia oxidizer to the flue gasses to oxidize excess ammonia in an ammonia oxidation zone located in the exhaust duct before the flue gasses reach the fly ash collecting device.

These and other features and advantages of this invention are described in, or are apparent from, the following detailed description of various exemplary embodiments of the systems and methods according to this invention.

BRIEF DESCRIPTION OF THE DRAWINGS

The above mentioned and other features of this invention will become more apparent and the invention itself will be better understood by reference to the following description of embodiments of the invention taken in conjunction with the accompanying drawing, wherein.

Corresponding reference characters indicate corresponding parts throughout the views of the drawings.

DEFINITIONS

In accordance with the present invention and as used herein, the following terms are defined with the following meanings, unless explicitly stated otherwise.

The term "SCR" refers to selective catalytic reduction.

The term "SNCR" refers to selective non-catalytic reduction.

The term "removal of ammonia" as used herein refers to the reduction of the ammonia concentration in flue gas.

The term "ammonia slip" refers to the amount of unused ammonia in processes where ammonia is provided to SNCR and/or SCR processes for reducing $NO_x$ pollution in flue gas.

The terms, "Ready-Mix" and "Ready-Mixed" refer to concrete premixed at concrete producing plants and delivered to sites in a slurry form.

The term "Portland cement" refers to the cement used in most Ready-Mix and precast concrete applications and has well established composition and performance specification (ASTM and CSA).

The term "CSA" refers to the Canadian Standards Association.

The term "ASTM" refers to American Society for Testing and Materials.

The following well known chemicals are referred to in the specification and the claims.

Abbreviations and common names are provided.

CO: carbon monoxide
$NO_x$: oxides of nitrogen
$NH_3$: ammonia
$SO_x$ oxides of sulfur
$CO_2$: carbon dioxide
$O_2$: oxygen
$N_2$: nitrogen gas

DETAILED DESCRIPTION OF EXEMPLARY EMBODIMENTS

The invention will now be described in the following detailed description with reference to the drawings, wherein preferred embodiments are described in detail to enable practice of the invention. Although the invention is described with reference to these specific preferred embodiments, it will be understood that the invention is not limited to these preferred embodiments. But to the contrary, the invention includes numerous alternatives, modifications and equivalents as will become apparent from consideration of the following detailed description.

Figure 1:
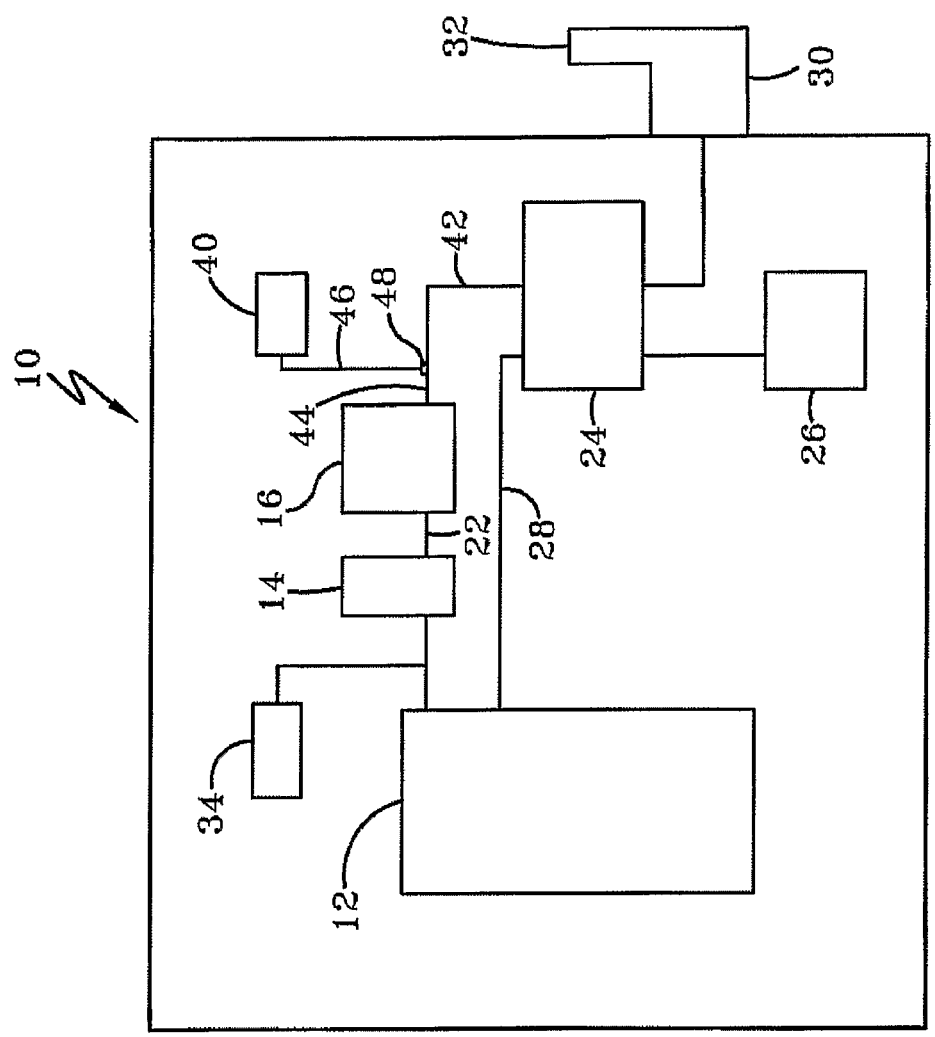
FIG. 1 is schematic view of a power plant having a chemical reagent addition system.

FIG. 1 schematically illustrates a fossil fuel burning power plant 10. A carbonaceous fuel such as coal is combusted with air in a furnace 12 and produces, in addition to power, combustion products contained within the flue gas. The flue gas may contain nitrogen oxides ($NO_x$), fly ash, $SO_2$, $SO_3$, and other undesirable pollutants. As shown, the plant 10 includes an SNCR reactor 14 and an SCR reactor 16 for reducing $NO_x$ downstream from the furnace 12. The level or amount of $NO_x$ in the flue gas is an important consideration because of environmental standards, which severely limit $NO_x$ emissions from fossil fuel burning power generation facilities. SNCR and SCR reactors 14 and 16 are well established, and detailed descriptions thereof are not necessary to one skilled in the art to understand the need for and operation of the instant invention. The power plant 10 in the illustrated embodiment shows both an SNCR reactor 14 and an SCR reactor 16, however, it is to be understood that the power plant may contain only a single reactor without departing from the scope of the invention.

The combustion flue gas exits from the furnace 12 into an exhaust duct 22. The exhaust duct 22 extends from the furnace 12 through a known air preheater 24, typically of the rotary regenerative type. Combustion air for the furnace 12 is provided by a blower 26 directing air to the furnace 12 through an inlet duct 28. The air preheater 24 is provided to heat the incoming combustion air. The flue gas passes from the preheater 24, through a suitable cleaning device, such as a baghouse or an electrostatic precipitator, schematically illustrated at 30, and is exhausted from the power plant 10 through a stack 32. The power plant 10 is only schematically shown in FIG. 1 and it is not deemed necessary to provide more information and background to understand, practice and enable the present invention. In an operating power plant, there are typically many other systems, as well as alternative systems, that are not shown here. It is to be appreciated that the present invention is compatible with such other systems and may, wherever applicable, be used with them.

As is known with SCR and SNCR reactors, a nitrogenous compound such as urea or ammonia is injected into the flue gas stream by an ammonia addition system 34 to convert $NO_x$ into free nitrogen and water. In most instances when using SNCR and/or SCR, a certain amount of ammonia added to the process is not utilized. This ammonia that passes through is commonly known as "ammonia slip". $NO_x$ reduction efficiency and ammonia slip levels are a function of the ($NH_3/NO_x$) molar ratio and other operating parameters, such as the SCR catalyst temperature, the catalyst space velocity, and the catalyst reactivity. For catalytic reduction (SCR) of oxides of nitrogen with ammonia to work well and result in the lowest values of $NO_x$, it is preferable to be able to use higher levels of ammonia. Typically, ammonia to $NO_x$ molar ratios ($NH_3/NO_x$) in SCR reactors ranges between about 0.6 and about 1.2, with higher molar ratios typically leading to a greater ammonia removal with other circumstances remaining the same. However, higher $NH_3/NO_x$ molar ratios lead to higher levels of ammonia slip.

According to the invention, a chemical reagent addition system 40 is located in the plant 10 downstream of the SCR and/or SNCR reactors 14 and 16 to remove undesirable ammonia slip by chemical oxidation. The chemical reagent addition system 40 adds an ammonia oxidizer, broadly a chemical reagent, to the flue gas to oxidize the excess ammonia in an ammonia oxidation zone 42 located in the exhaust duct 22 before the ammonia leaves the stack 32.

In one embodiment, the chemical reagent addition system 40 comprises a chemical reagent spraying system configured to spray or otherwise distribute the chemical reagent into the flue gas as the flue gas passes through the exhaust duct 22. Preferably, the chemical reagent addition system 40 adds the chemical reagent in form a dilute solution spray into the flue gas stream. The chemical reagent is desirably dissolved or suspended in water or other solute in concentrations between about 2% and about 30%, and more preferably between about 5% and about 20%. The amount of ammonia oxidizer the chemical reagent addition system 40 injects into the flue gas is selected depending on the ammonia slip level, the desired reduction in ammonia concentration, and plant and flue gas specific system parameters such as the size of the flue gas duct 22, flue gas flow rate and velocity, flue gas temperature, and retention time between the SCR reactor 16 and the air preheater 24. The water containing the chemical reagent is pumped under high pressure and delivered to the exit region 44 of the SCR reactor 16 in appropriate conveyance pipes 46. The water containing the chemical reagent is then atomized inside the flue gas ducts 22 using spray nozzles 48. The number, location, and layout of the spray nozzles 48 is dependent on the size and orientation of the plant 10 and will be a function of plant size and other design and operating parameters.

The chemical reagent desirably belongs to a group comprising chlorine, hypochlorites, and related halogen oxidizers such as those related to the fluorine and bromine compounds. In some embodiments, the chemical reagent is a hypochlorite ($OCl^-$) containing oxidizer found in the form of calcium hypochlorite ($Ca(OCl)_2$), sodium hypochlorite (NaOCl), lithium hypochlorite (LiOCl), trichloro-s-triazinetrione (trichlor), and the like. Chlorine gas may also be used in lieu of solid and liquid halogen oxidizers and oxidizing compounds. As used herein, the phrase hypochlorite containing oxidizer is used to denote compounds that include the hypochlorite moiety or form such moiety upon addition of water. For example, the trichor compound forms hypochlorous acid and cyanuric acid upon water addition. At elevated pHs, the hypochlorous acid ionizes to the hypochlorite ion. The chemical reagent is desirably selected from compounds capable of oxidizing ammonia in gas phase at certain flue gas temperatures and specific operating conditions. Additionally, it is preferably that the chemical reagents not produce significant amounts of additional oxides of nitrogen by side reactions of the oxidation of ammonia.

Desirably, addition rate of the chemical reagent addition system 40 is sufficient to reduce the ammonia slip under flue gas conditions downstream of the SCR reactor by chemical oxidation to levels of about 10 ppm or less, more preferably to levels of about 5 ppm or less, and even more desirably, to about 2 ppm or less.

In operation, the chemical reagent addition system 40 is used in the power plant 10 as a method of removing ammonia in flue gas where ammonia is used as selective catalytic reduction agent with a primary catalyst for reducing oxides of nitrogen. The method desirably includes adding excess ammonia to flue gas to reduce oxides of nitrogen as part of the SNCR and/or SCR 14, 16 reactors. An ammonia oxidant is selected to reduce the residual ammonia in the flue gas and added to the exhaust duct 22 by the chemical reagent addition system 40 to create the ammonia oxidation zone 42 downstream from the SCR and/or SNCR reactors 14, 16. The oxidant is added in amounts sufficient to reduce ammonia concentration in exiting flue gas to the desired level, preferably 5 ppm or less.

In order that the invention may be more readily understood, reference is made to the following example, which is intended to be illustrative of the invention, but is not intended to be limiting in scope.

EXAMPLE 1

An ammonia-laden hot air stream was injected with the dilute calcium hypochlorite reagent and together, both streams passed through a heated reaction zone. Residual ammonia concentrations were measured at the exit of the reaction zone to determine removal percentages. The gas concentrations used during the experiments were: Oxygen (21 volume percent, dry), Nitrogen (79 volume percent, dry), and Ammonia (~20 ppmvd at actual oxygen percentage). Calcium hypochlorite was injected, as a dilute solution, prior to the reaction zone. Injection rates were based upon the stoichiometric ratio of chlorine in the reagent to ammonia in the gas stream. Reaction temperatures were chosen to represent post SCR conditions. Flow rate, space velocity, residence time, and reaction zone volume were all dependent on one another, and each of these parameters was specified prior to beginning any experiments. A list of the test conditions is supplied in Table 1.

TABLE 1

| Test Conditions | |
| --- | --- |
| Parameter | Value |
| Temperature (° F.) | 350, 450, 550, 700 |
| Oxygen (vol %, dry) | 21 |
| Nitrogen (vol %, dry) | 79 |
| Ammonia (ppmvd) | ~20 |
| Calcium Hypochlorite (Stoichiometric Ratio to Ammonia) | 10, 20, 150, 500 |
| Flow rate (lpm @ 70° F. and 1 atm) | 15 |
| Residence Time (s) | 1 |
| Space Velocity ($hr^{-1}$) | 3600 |

All sample lines, reactors, etc., were maintained at the experiment temperatures listed in Table 1. Data from an MKS-FTIR ammonia analyzer were transmitted to a PC for real-time graphical representation.

Calcium hypochlorite was injected using a nebulizer. This spray nozzle device is used to create small liquid droplets that produce a high surface area and a high rate of evaporation. The amount of calcium hypochlorite injected into the ammonia-laden gas stream was controlled in two ways. The concentration of the reagent solution used could be increased or decreased allowing variability or the nebulizer liquid flow rate could be controlled. Solutions of 0.5, 1, and 10 percent by weight were used, and liquid flows of 2 and 5.5 ml/min were tested. These variables produced stoichiometric ratios of 10, 20, 150, and 550.

Data/Results

Baseline measurements were collected using deionized water in place of the calcium hypochlorite reagent. Liquid flow rates were confirmed by performing a drawdown before each test condition. A baseline measurement was run before and after every test condition performed in the experiment. A total of nine test conditions were run during the experiment. Variables were temperature and stoichiometric ratio of chlorine to ammonia. The temperature was measured using a thermocouple located inside the furnace containing the reactive section. The stoichiometric ratio was controlled by adjusting the flow rate and concentration of calcium hypochlorite. A list of the test conditions is supplied in Table 2.

TABLE 2

| Test Conditions | | | | | | |
| --- | --- | --- | --- | --- | --- | --- |
| Condition | $NH_3$ In (ppm) | $H_2O$ (%) | Temp (° F.) | Stoichiometric Ratio | Reagent Injection Rate (mlpm) | CalHypo (wt. %) |
| 1 | 21 | 10 | 350 | 550 | 5.6 | 10 |
| 2 | 20 | 13 | 450 | 550 | 5.5 | 10 |
| 3 | 16 | 17 | 550 | 550 | 5.6 | 10 |
| 4 | 14 | 24 | 700 | 550 | 5.4 | 10 |
| 5 | 20 | 8 | 700 | 150 | 1.6 | 10 |
| 6 | 25 | 10 | 350 | 150 | 2.1 | 10 |
| 7 | 22 | 10 | 350 | 20 | 2.1 | 1 |
| 8 | 25 | 10 | 700 | 20 | 2.0 | 1 |
| 9 | 23 | 10 | 700 | 10 | 2.0 | 0.5 |

Figure 2:
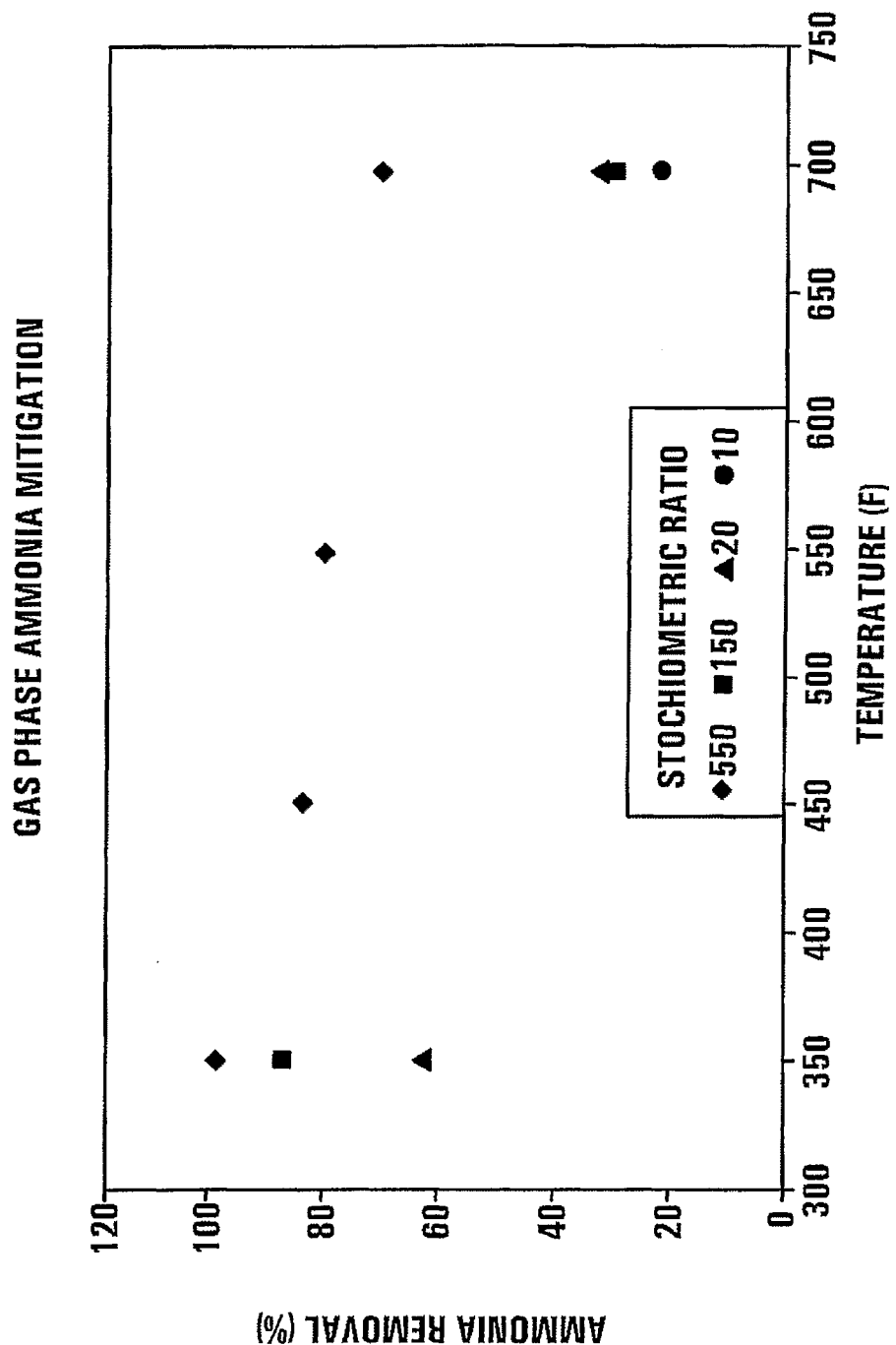
FIG. 2 graphs ammonia removal percentages for an exemplary chemical reagent addition system.

After establishing a baseline for each test condition the water injection was then swapped to calcium hypochlorite injection. Again, the flow rate of liquid was measured using a drawdown procedure. After sufficient data were collected and the system had reached equilibrium the removal percentages were calculated based upon inlet and outlet ammonia concentrations. The removal percentages are illustrated in FIG. 2.

As can be seen, the process described herein is beneficial because it allows the use of greater amounts of ammonia to be used to reduce the oxides of nitrogen in the flue gas with lowered emissions. In addition, the amount of ammonia slip is reduced so the fly ash can be used as additives for concrete by admixture with cement.

The above presents a description of the best mode of carrying out the present invention and of the manner and process of making and using the same. This invention is, however, susceptible to modifications and alternate constructions from that discussed above which are fully equivalent. Consequently, it is not the intention to limit this invention to the particular embodiment disclosed herein. On the contrary, the intention is to cover all modifications and alternate constructions coming within the spirit and scope of the invention as generally expressed by the following claims, which particularly point out and distinctly claim the subject matter of the invention.

What is claimed is:

1. A method for reducing ammonia slip in flue gas of a fossil fuel burning power plant, the power plant having an oxides of nitrogen (NOx) reducing system and a fly ash collecting device, wherein ammonia is used for reducing the levels of NOx, the method comprising:
    adding ammonia from an ammonia addition station to the flue gas to reduce oxides of nitrogen (NOx);
    providing a chemical reagent addition system downstream from the ammonia addition station; and
    adding an oxidizing chemical reagent from the chemical reagent addition system to form an ammonia oxidation zone in the flue gas exhaust duct upstream of the fly ash collecting device such that the flue gasses exiting the ammonia oxidation zone have a residual ammonia concentration of less than about 20 ppm wherein the chemical reagent is selected from a group of oxidizing compounds consisting of chlorine, fluorine, and bromine compounds.

2. A method as recited in claim 1 wherein the chemical reagent addition system adds the chemical reagent in form a dilute solution spray into the flue gas stream.

3. A method as recited in claim 2, wherein the added oxidizing chemical reagent is dissolved in water in concentrations between about 5% and about 20%.

4. A method as recited in claim 3, wherein the added oxidizing chemical reagent is pumped under pressure and delivered to an exit region of the SCR reactor where the added oxidizing chemical reagent is atomized inside the flue gas exhaust duct with a plurality of spray nozzles.

5. A method as recited in claim 1 wherein the ammonia concentration in flue gas exiting the plant is 2 ppm or less.

6. A method for reducing ammonia slip in flue gas of a fossil fuel burning power plant, the power plant having an oxides of nitrogen ($NO_x$) reducing system and a fly ash collecting device, wherein ammonia is used for reducing the levels of $NO_x$, the method comprising:

adding ammonia from an ammonia addition station to the flue gas to reduce oxides of nitrogen ($NO_x$);

providing a chemical reagent addition system downstream from the ammonia addition station; and adding an oxidizing chemical reagent from the chemical reagent addition system to form an ammonia oxidation zone in the flue gas exhaust duct upstream of the fly ash collecting device such that the flue gasses exiting the ammonia oxidation zone have a residual ammonia concentration of less than about 20 ppm wherein the chemical reagent is selected a group of oxidizing compounds consisting of calcium hypochlorite ($Ca(OCl)_2$), sodium hypochlorite (NaOCl), lithium hypochlorite (LiOCl), and trichloro-s-triazinetrione (trichlor).

7. A method as recited in claim 6 wherein the chemical reagent is calcium hypochlorite.

8. A method as recited in claim 6 wherein the flue gasses temperature is between 100° C. and 360° C. in the ammonia oxidation zone.

* * * * *